(No Model.) 2 Sheets—Sheet 1.
G. D. HAWORTH.
REEL FOR CHECK ROW WIRE.
No. 534,474. Patented Feb. 19, 1895.
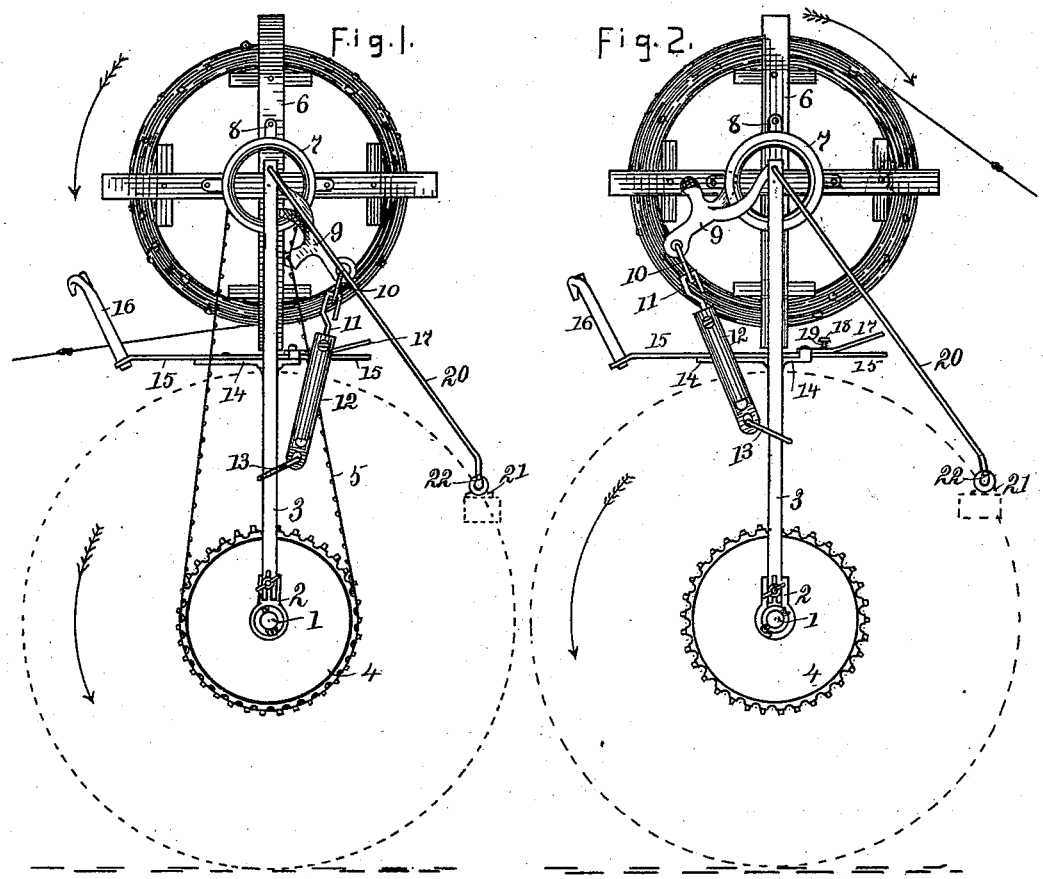
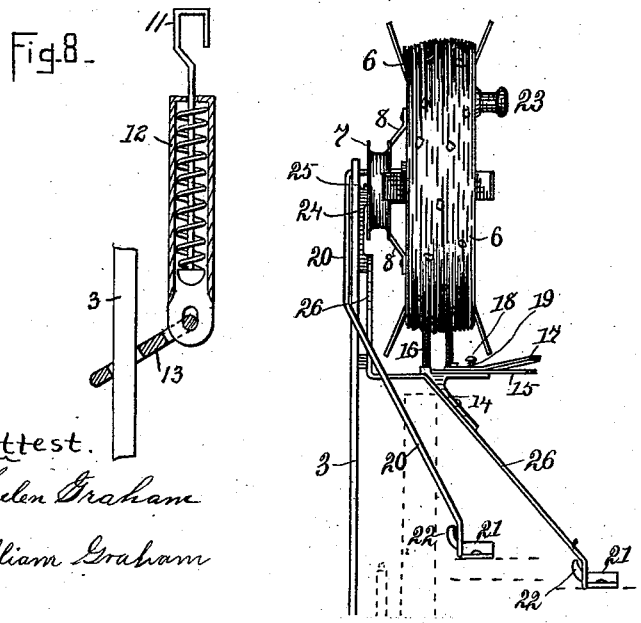
Attest.
Helen Graham
William Graham
INVENTOR.
George D. Haworth.
by his attorney
L. R. Graham (No Model.) 2 Sheets—Sheet 2.
G. D. HAWORTH.
REEL FOR CHECK ROW WIRE.
No. 534,474. Patented Feb. 19, 1895.
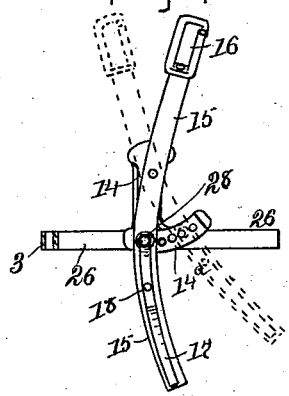
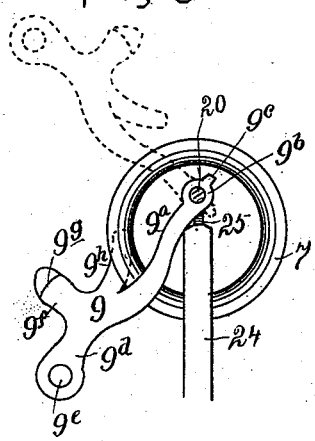
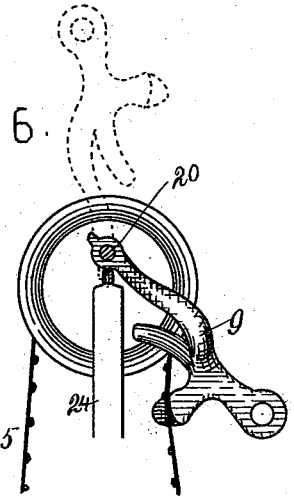
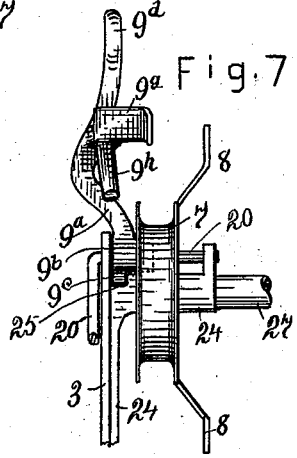
Attest
Helen Graham
William Graham
Inventor
George D. Haworth.
by his attorney
L. P. Graham

UNITED STATES PATENT OFFICE.

GEORGE D. HAWORTH, OF DECATUR, ILLINOIS.

REEL FOR CHECK-ROW WIRE.

SPECIFICATION forming part of Letters Patent No. 534,474, dated February 19, 1895.

Application filed September 17, 1894. Serial No. 523,210. (No model.)

*To all whom it may concern:*

Be it known that I, GEORGE D. HAWORTH, of Decatur, in the county of Macon and State of Illinois, have invented certain new and useful Improvements in Reels for Check-Row Wire, of which the following is a specification.

This invention relates to reeling mechanism adapted to be mounted on a planter and operated therefrom. It is exemplified in the structure hereinafter specified, and it is defined in the appended claims.

In the drawings forming part of this specification Figure 1 is a side elevation of a reel constructed in accordance with my invention and arranged to reel up the wire by power derived from a wheel of a planter. Fig. 2 is a side elevation of the device as it appears when unreeling the wire. Fig. 3 is a rear elevation of the frame of the reel. Fig. 4 is a plan of the wire guide mechanism. Figs. 5, 6 and 7 are detail representations illustrating the operation of the combined brake and friction developer. Fig. 8 is a longitudinal section of the cylinder of the presser with its spring therein.

The projecting end of the spindle of the axle of a planter wheel is shown at 1.

4 represents a sprocket wheel adapted to rotate with the planter wheel.

2 is a clip loosely embracing the end of the spindle.

3 is a standard rising from the clip and acting as a support for the reel, and the connection between the clip and the standard is preferably of a nature to permit a limited degree of vertical adjustment in the standard. In this particular case the lower end of the standard is slotted and the bolt used to secure the standard to the clip extends through the slot.

5 is a sprocket chain that runs over wheel 4 and the pulley 7 of the reel, when the wire is being reeled up by power derived from the planter wheel.

6 is the reel frame, or spider, which may be of any desired construction.

7 is an annular, *i. e.,* a hubless and spokeless, pulley which is secured to the reel spider by lugs 8.

9 is the swinging arm that acts as a brake when the wire is unreeling, and as a friction developer when the planter is used to reel up the wire.

10 is a link connecting with the swinging end of the arm, and with the hooked end of rod 11.

12 is a cylinder that contains a spring which acts on rod 11 with a tendency to draw it from the end of the swinging arm.

13 is a cramp link that connects with the lower end of the cylinder and slips somewhat loosely over standard 3. When the link is permitted to assume a horizontal position, or, which is the same thing, extend at right angles from the standard, it may be easily slipped up and down to attain any desired position, and when it is turned obliquely, as indicated in Figs. 1 and 2, it will cramp on the standard and maintain its position firmly.

Bracket 24 is secured to the upper end of the standard 3, and it projects at right angles therefrom, passing through pulley 7 and providing a spindle, as 27 in Fig. 7, on which the reel rotates.

A notch 25 in the upper surface of the bracket, close to the standard, has a function in connection with the swinging arm 9 which will be hereinafter explained.

Brace bar 26 connects with the standard, and incidentally with bracket 24. It extends inward, across the planter wheel, and obliquely downward to the axle of the planter, or some other part of the frame, where it terminates in an eye. The brace rod 20 has, at its upper end, a horizontal bearing in the standard and in a lug extended upward from bracket 24, as shown in Fig. 7, and the horizontal portion forms a pivot bearing for the swinging arm 9. It extends obliquely downward and backward to a cross bar of the planter and terminates in an eye.

Clips 21 are secured to the planter frame in positions to coincide with the terminations of braces 20 and 26, respectively, and they are each provided with an upwardly curved pin, as shown in Fig. 3, which is adapted to engage the eye of a brace when the reel frame is tilted inward at the upper end, and to retain the brace against disengagement while the reel frame is upright.

A bracket, 14, is secured to brace bar 26, and it provides a pivot for the horizontally swinging arm 15. The arm has, at its forward end, a guide, 16, to direct the wire to the reel. The bracket has a set of holes in the arc of a circle with the arm pivot for a center, and the handle part of the arm is provided with a stop-lever 17, which has a pin that extends through the arm and engages the holes of the bracket. The stop lever is preferably provided with a spring 19, on pin 18, which presses downward on the lever and tends to hold the stop pin in engagement with a hole of the bracket.

The arm 9 comprises the member $9^a$ having the eye $9^b$ and the stud $9^c$ projecting radially from the eye. The member $9^d$ is an extension of member $9^a$ and it is provided with an eye $9^e$ for the attachment of link 11. Member $9^f$ has a bearing surface $9^g$, adapted to engage the sprocket chain, and member $9^h$ is a brake finger that engages the pulley while the wire is unreeling. The horizontal portion of rod 20, which forms the bearing for the swinging arm 9, is above the center of the reel, and consequently the swing of the arm is eccentric with relation to the rotation of the reel.

A handle 23, secured to the reel as seen in Fig. 3, is provided in case it should be desirable, at any time, to operate the reel by hand.

The reel is secured to the planter by tilting the upper end inward until the eyes of the braces will slip over the hooks of clips 21, then swinging it upright and securing clip 2 on the outer end of the wheel spindle.

To unreel the wire, the arm 9 is swung into the position indicated in Fig. 2, with the brake finger engaging the face of the pulley, the link 13 is adjusted on the standard to give the required tension to the spring in the cylinder, an end of the wire is secured to an anchor at one side of the field, and the planter is driven forward in the customary manner while the wire is stretched at a uniform and proper tension.

In preparing to reel up the wire, the sprocket chain is put in place on the wheel and pulley, the arm 9 being first swung over to the opposite side of the pulley and the brake finger being moved out of contact with the face of the pulley, as indicated in Figs. 1 and 6. The wire is taken to the reel through the guide 16, the tension of the spring in the cylinder is regulated to cause the arm to bear against the sprocket chain with sufficient force to cause the chain to drive the smooth pulley and wind up the wire, and the planter is drawn forward, toward the wire. As the wire accumulates on the reel the diameter of the winding surface increases, causing the wire to be wound with a constantly accelerating speed, and eventually the reel will wind faster than the planter travels. To accommodate this peculiarity, and to provide for other irregularities in the operation of the device, the spring in the cylinder will yield whenever the stress on the reel exceeds what is necessary to wind the wire, and permit the planter to gain motion sufficient to make up for the increased winding speed of the reel.

In swinging the arm 9 from the position indicated in Fig. 5 to that indicated in Fig. 6 it is necessary that the finger $9^h$ should be moved laterally to clear the pulley. This may be easily done without any special provision, provided the operator shall always use reasonable care, but to make it certain that this adjustment will not be overlooked the stud $9^c$ is formed on the eye of the arm and the recess 25 is provided in bracket 24. The stud and the recess bear such relation one to the other that the arm can not be swung from the braking position to the friction-developing position without moving the arm sufficiently far sidewise to carry the brake finger clear of the pulley. This is illustrated in Figs. 5, 6 and 7 and may be explained as follows: With the arm resting in the position indicated in solid lines in Fig. 5, an attempt to swing it directly over the pulley will be arrested by the stud coming in contact with the bracket, when the position shown in dotted lines is reached, and the arm must be moved sidewise to the position shown in Fig. 7 before further progress can be made. After the arm has passed the recess of the bracket it will fall to its proper position without further attention.

The wire guide provides means for distributing the wire evenly on the reel, and its operation consists in shifting the guide loop from side to side and holding it temporarily in its different positions by means of the lock pin of the stop lever 17. The shifting will ordinarily be from hole to hole successively back and forth over the bracket, but the loop may be set to cause the wire to fill a depression, regardless of the order specified. The guide may be used to equal advantage when the wire is wound up by hand, and the operation in that case is the same as above described.

The juncture of the standard with the clip, or yoke, 2 is made adjustable in order that the reel may be set to properly conform to the length of the chain; and the adjustment is also serviceable in taking up for wear.

Having thus described my invention, I claim as new and desire to secure by Letters Patent—

1. A reeling appliance for check row wire adapted to be mounted on a planter, such appliance comprising, as essential elements, a reel spider, a guide to conduct the wire to the spider, a chain adapted to be driven from the planter, a spider-rotating pulley adapted to be driven by frictional contact with the chain, and an elastically controlled presser arm bearing against the chain and regulating the frictional pull on the pulley, substantially as set forth.

2. A reel for check-row wire consisting of a reel frame, a reel mounted thereon, a drive pulley secured to the reel concentric therewith, a drive chain adapted to drive the pulley by frictional contact, a swinging arm having a frictional bearing adapted to engage the chain, and a spring connected with the swinging end of the arm and with a relatively immovable part of the device, substantially as set forth.

3. In a reel for check-row wire, the combination of a drive chain for the reel, a presser to engage the chain, a spring for the presser and an adjusting link connected with the spring and loosely encircling a rod, as set forth, whereby the link may be adjusted slidably on the rod when turned at right angles therewith and will be cramped obliquely and firmly on the rod by the action of the spring.

4. In a check-row wire reel, the combination of a chain, a pulley driven by frictional contact of the chain, and an arm swung on a pivot eccentric with the pulley and having a brake finger for the pulley and a presser bearing for the chain, substantially as set forth.

5. In a check-row wire reel, the combination of a chain, a friction pulley, an arm swung slidably on a pivot eccentric with the pulley, a brake finger and a chain bearing on the arm, and an impediment to the swing of the arm which compels the brake finger to be moved laterally, clear of the pulley, before the chamber bearing of the arm may engage the chain, substantially as set forth.

6. A frame for check-row wire reels comprising a standard having a yoke adapted to slip over the spindle of a planter wheel, braces having eyes at their lower ends, and clips on the planter frame having upwardly curved pins adapted to engage the eyes of the braces, whereby the frame may be connected with and disconnected from the planter both easily and speedily.

7. In a reel for check-row wire, the combination of a yoke adapted to the spindle of a planter wheel, a reel standard secured to the yoke in a manner permitting longitudinal adjustment, a reel pulley carried by the standard, a sprocket wheel attached to the planter wheel, and a chain running from the sprocket wheel to the pulley, substantially as and for the purpose set forth.

8. The combination with a reel for check-row wire, of a horizontally swinging arm carrying a guide loop for the wire, and an adjustable lock stop for holding the guide arm in different positions, substantially as set forth.

9. The combination with a reel for check row wire, of a horizontally swinging arm having a guide loop on one side of the fulcrum and an adjustable lock stop on the opposite side, substantially as set forth.

10. A guide for reels, comprising the horizontally swinging arm 15 having a guide loop 16 on one end and a stop lever 17 on the other end, and the bracket 14 providing a fulcrum for the arm and having a set of holes for the pin of the stop lever, substantially as set forth.

In testimony whereof I sign my name in the presence of two subscribing witnesses.

GEO. D. HAWORTH.

Attest:
  D. A. STRADER,
  NELLIE E. HUBBARD.